Patented May 9, 1950

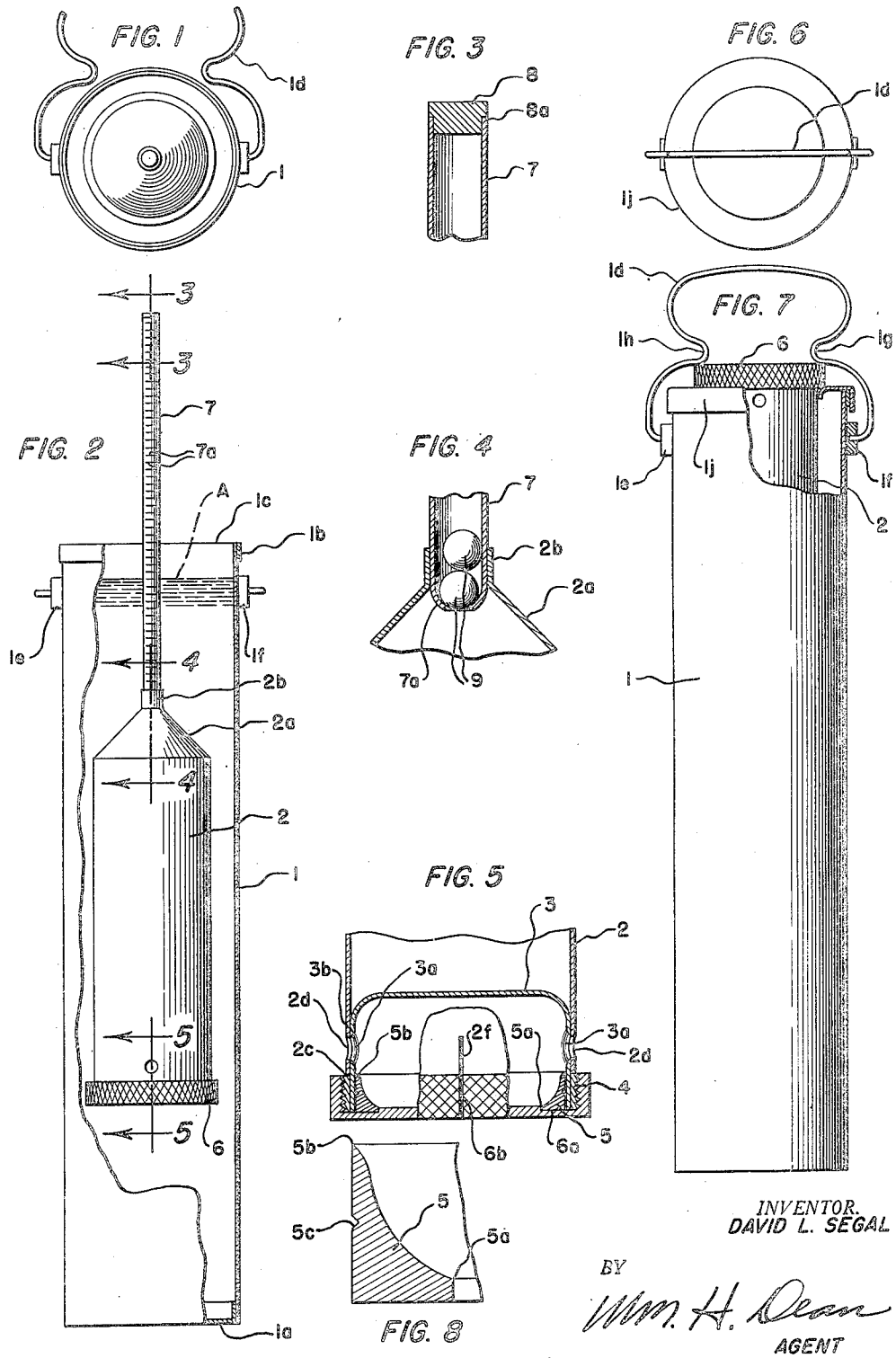

2,506,973

UNITED STATES PATENT OFFICE 2,506,973

LIPOMETER

David L. Segal, San Diego, Calif.

Application September 11, 1948, Serial No. 48,899

6 Claims. (Cl. 73—33)

My invention relates to a lipometer, more particularly for use as a hydrometric measuring device in determining the lipoid or other content of various semi-solid and/or fibrous foodstuffs, such as chopped or ground meat or hamburger, or the like, and the objects of my invention are:

First, to provide a lipometer of this class in which an excluding ring is employed in connection with the food sample cup of the lipometer for accurately securing a definite reproducible volume of sample, and properly sealing the same within the sample containing cup, preliminary to the hydrometric measurement of the sample for determining its lipoid or other content by means of specific gravity.

Second, to provide a lipometer of this class having very precise means for securing a definite volume of a sample being tested with close reproducibility.

Third, to provide a lipometer of this class which is capable of very precise measurement of food adulteration with an excess of fat, or other content.

Fourth, to provide a lipometer of this class having a novel vented sample containing cup in which compressibility of a certain food at a certain temperature is very accurately controlled, whereby the sample being tested always weighs a certain amount within very close tolerances.

Fifth, to provide a lipometer of this class in which an excluding ring is employed at the open edge of the sample-receiving cup, which prevents portions of the sample from being extruded about the edge of the sample-receiving cup when the sample is compressed therein.

Sixth, to provide a lipometer of this class having an excluding ring which is peripherally fitted to the inner side of the sample-receiving cup in slidable relationship therewith, and provided with a central opening fitted in close tolerance with a concentric projection of the sample cup preventing peripheral extrusion of the sample around said ring adjacent the inner wall of the sample-receiving cup and near the inner edge of the excluding ring adjacent the sample cup cap;

Seventh, to provide a lipometer of this class in which the sample being tested is at the lower extremity of said lipometer for maintaining the lowest possible center of gravity thereof for uniformity of measurement and accurate determination of percentage of lipids or other content in various foods.

Eighth, to provide a lipometer of this class in which sample cup is an integral part of the major portion of the lipometer, thus affording the operator an area of sufficient grip for the purpose of compressing the sample being tested.

Ninth, to provide a lipometer of this class which is very simple and economical of construction, efficient in operation, and which will not readily deteriorate or get out of order, and Tenth, to provide a lipometer of this class which is practical for all food operators to use in controlling and standardizing their product within the legal standard.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a top or plan view of my lipometer, shown in its cooperative water container; Fig. 2 is a side elevational view of my lipometer, shown in its water container, and illustrating a section of the water container broken away and in section to amplify the illustration; Fig. 3 is an enlarged fragmentary sectional view taken from the line 3—3 of Fig. 2; Fig. 4 is an enlarged fragmentary sectional view taken from the line 4—4 of Fig. 2; Fig. 5 is an enlarged fragmentary sectional view taken from the line 5—5 of Fig. 2, showing parts and portions in elevation to amplify the illustration; Fig. 6 is a top or plan view of my lipometer, shown in position for transportation within its cooperative water container; Fig. 7 is a side elevational view similar to the structure shown in Fig. 6; and Fig. 8 is a fragmentary sectional view of the excluding ring of my lipometer, similar to Fig. 5 showing the structure on enlarged scale.

Similar characters of reference refer to similar parts and portions throughout the several views of the drawing.

The water container 1 is a hollow cylindrical casing, preferably made of stainless steel, having a formed bottom 1a, and a surrounding band 1b at its upper open end 1c. This water container 1 is provided with a pivoted handle 1d, shown best in Fig. 7 of the drawing, having its opposite ends mounted in recessed lugs 1e and 1f, fixed to the outer side of the container 1, all as shown best in Figs. 2 and 7 of the drawing. The handle 1d is provided with inwardly directed loop portions 1g and 1h, which are arranged to resiliently clip over the cap 6 in connection with the float casing 2, as shown in Fig. 7 of the drawing, when the rim of said cap 6 is engaged with the adapter ring 1j of the water container 1, for supporting my lipometer in its cooperative water container 1 for transportation thereof. As shown in Fig. 2 of the drawings, the water container 1 is of sufficient diameter to receive the float casing 2, together with the cap 6, and this water container 1 is water-tight, providing a means in which the lipometer may be hydrostatically floated to determine the relative weight of certain foodstuffs maintained in connection with the lipometer during testing thereof.

The float casing 2, shown in Fig. 2 of the drawing, is a hollow straight cylindrical member having a conical upper end 2a, provided with a short straight collar 2b, which is integral therewith. Disposed inwardly of this collar 2b is the lower end of the float neck 7, which is provided with a reduced in diameter portion 7a, at its lower end. Positioned in the lower end of this neck 7 are the weights 9. The upper end of the neck 7 is enclosed at its open portion by the plug 8, which is provided with a shoulder portion 8a, substantially coinciding in diameter with the external diameter of the tubular float neck 7, all as shown best in Figs. 3 and 4 of the drawing. Positioned internally of the lower end of the float casing 2 is the cup 3. This cup 3, near its open end, projects slightly beyond the open end 2c of the float casing 2, as shown best in Fig. 5 of the drawing. Secured on the cup 3, surrounding its portion projecting from the end of the float casing 2, is the thread ring 4. This thread ring 4 and the cup 3 may be secured in connection with the float casing 2 by fusion of solder or other similar alloys, as desired. Screw threaded on the thread ring 4, externally thereof, is the cap 6. Internally of this cap 6 is the excluding ring 5, which fits in a recess portion 6a of the cap 6, at its inner edge 5a, all as shown best in Fig. 5 of the drawing. As shown on enlarged scale in Fig. 8 of the drawing, the inner peripheral edge 5b of the excluding ring 5 is relatively sharp and is fitted in close tolerance relationship with the inner wall of the cup 3, in order to prevent extrusion of material past the perimeter of the excluding ring, when forcing the same into the cup 3 and compressing the material therein for obtaining an accurate volumetric measurement of the sample to be tested.

Recessed in the perimeter of the excluding ring 5 is a groove 5c, which serves as an index for the filling of the cup 3 with the excluding ring 5 in place, whereby the index 5c is placed at the open edge of the cup 3, preliminary to the screw-threaded connection of the cap 6 for compressively filling the cup 3 and extruding excess material from the holes 3a in the side walls thereof, which coincide with the openings 2d in the walls of the float casing 2, in which the cup 3 is positioned. The outer side of the float casing 2 is provided with an index mark 2f, with which the index notch 6b of the cap 6 must coincide for accurate measurement of a sample according to volumetric displacement within the cup 3. It will be noted that the holes 3a in the cup 3 are provided with a slight surrounding radius 3b, for smooth extrusion of excess meat or other material forming the sample in the cup 3 during the forceful screw-threaded connection of the cap 6 with the thread ring 4.

The operation of my lipometer is substantially as follows: When it is desired to test a sample of meat or other material, the operator removes the cap 6 and excluding ring 5 from the thread ring 4 and cup 3. He then packs the cup 3 full of the material to be tested and then places the excluding ring 5, at its sharp edge 5b, inwardly of the open edge of the cup 3 and forces the same downwardly until the index groove 5c coincides with the outer end of the cup 3. The cap 6 is then screw-threaded on the thread ring 4 until the index portion 6b matches the index portion 2f on the float casing 2. It will be noted that during the screw-threaded advancement of the cap 6 on the thread ring 4 it forces the excluding ring into the recess 6a, wherein the annular edge 5a at the internal opening of the excluding ring 5 rests in close tolerance relationship with the inner edge of the recess 6a, preventing meat from being extruded intermediate the excluding ring 5 and the cap 6. During the inward travel of the excluding ring 5 in the cup 3, the sharp edge 5b of the excluding ring 5 substantially scrapes the walls of the cup 3, preventing the extrusion of meat intermediate the excluding ring 5 and the inner wall of the cup 3. In addition to the foregoing operations performed in the advancement of the cap 6, meat or other material forming part of the sample is extruded from the openings 3a and 2d of the cup 3 and float casing 2, and a certain length of time elapses after the material has been extruded from said openings 3a and 2d, permitting the compression of material in the cup 3 to reach a certain static balance, with the atmospheric pressure and the friction involved in extruding the material from the openings 3a, extruded material is wiped off. The float casing is then placed in the water container 1, which is substantially filled with water, and lipometer is spun or twirled to release air bubbles which may adhere, and the neck 7 of the float 2 projects above the upper surface A of the water, and a reading is taken at one of the graduations 7a on the neck 7 appearing at the surface of the water. This reading indicates the specific relationship of the sample within the cup 3 relatively to water in the water container 1. It will be here noted, however, that initial adjustment of the float casing 2, is made as shown best in Figs. 3 and 4 of the drawing. When my lipometer is not in use, it is placed in the water container 1, as shown in Figs. 6 and 7 of the drawing, and the handle 1d maintains the same in place against the adapter ring 1j, all as shown best in Fig. 7 of the drawing.

It will be here noted that the curved corners in the cup 3 and ring 5 are functional and prevent formation of air pockets in the test sample when compressed.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a device of the class described, a hollow float casing, having a sample-receiving compartment therein, open at the lower end thereof, an excluding ring closely fitted to the internal wall of said sample-receiving compartment, at the open end thereof, said excluding ring having a relatively sharp inner annular edge, and a central opening therein of considerably smaller diameter than the inside diameter of said sample-receiving compartment, and a cap screw-threaded on the outer side of said sample-receiving compartment adapted to engage said excluding ring and force the same inwardly into said compartment.

2. In a device of the class described, a hollow float casing, having a sample-receiving compartment therein, open at the lower end thereof, an excluding ring closely fitted to the internal wall of said sample-receiving compartment, at the open end thereof, said excluding ring having a relatively sharp inner annular edge, and a central opening therein of considerably smaller diameter than the inside diameter of said sample-receiving compartment, and a cap screw-threaded on the outer side of said sample-receiving compartment adapted to engage said excluding ring and force the same inwardly into said compartment, said compartment having extrusion openings in the side walls thereof, which are beveled inwardly.

3. In a device of the class described, a hollow float casing, having a sample-receiving compartment therein, open at the lower end thereof, an excluding ring closely fitted to the internal wall of said sample-receiving compartment, at the open end thereof, said excluding ring having a relatively sharp inner annular edge, and a central opening therein of considerably smaller diameter than the inside diameter of said sample-receiving compartment, and a cap screw-threaded on the outer side of said sample-receiving compartment adapted to engage said excluding ring and force the same inwardly into said compartment, said compartment having extrusion openings in the side walls thereof, said cap having an annular inwardly projecting portion closely fitted inside the internal opening of said exclusion ring.

4. In a device of the class described, a hollow float casing, having a sample-receiving compartment therein, open at the lower end thereof, an excluding ring closely fitted to the internal wall of said sample-receiving compartment, at the open end thereof, said excluding ring having a relatively sharp inner annular edge, and a central opening therein of considerably smaller diameter than the inside diameter of said sample-receiving compartment, and a cap screw-threaded on the outer side of said sample-receiving compartment adapted to engage said excluding ring and force the same inwardly into said compartment, said compartment having extrusion openings in the side walls thereof, said cap having an annular inwardly projecting portion closely fitted inside the internal opening of said exclusion ring, said compartment at its outer side having an index, said cap having an index adapted to coincide with the index on the outer side of said compartment.

5. In a device of the class described, a hollow float casing, having a sample-receiving compartment therein, open at the lower end thereof, an excluding ring closely fitted to the internal wall of said sample-receiving compartment, at the open end thereof, said excluding ring having a relatively sharp inner annular edge, and a central opening therein of considerably smaller diameter than the inside diameter of said sample-receiving compartment, and a cap screw-threaded on the outer side of said sample-receiving compartment adapted to engage said excluding ring and force the same inwardly into said compartment, a stem on said float casing having graduations spaced longitudinally thereof.

6. In a device of the class described, a hollow float casing, having a sample-receiving compartment therein, open at the lower end thereof, an excluding ring closely fitted to the internal wall of said sample-receiving compartment, at the open end thereof, said excluding ring having a relatively sharp inner annular edge, and a central opening therein of considerably smaller diameter than the inside diameter of said sample-receiving compartment, and a cap screw-threaded on the outer side of said sample-receiving compartment adapted to engage said excluding ring and force the same inwardly into said compartment, a stem on said float casing having graduations spaced longitudinally thereof, a water container in which said float casing is suspended, and above the surface of which said stem projects, whereby said graduations may be read at the surface of water in said water container.

DAVID L. SEGAL.

REFERENCES CITED

The following references are of record in the file of this patent:

UNITED STATES PATENTS

| Number | Name | Date |
|---|---|---|
| 959,633 | Sommer | May 31, 1910 |
| 1,074,039 | Berberich | Sept. 23, 1913 |
| 1,485,022 | Fesler | Feb. 26, 1924 |
| 1,827,844 | Grossman | Oct. 20, 1931 |
| 2,006,549 | Hartley | July 2, 1935 |